United States Patent Office 3,579,508
Patented May 18, 1971

3,579,508
21-SUBSTITUTED 6-CHLORO - 16α,17α-ISOPROPYL-
IDENEDIOXY-PREGNA - 4,6 - DIENE-3,20-DIONE
AND METHOD OF PREPARING THE SAME
Milton David Heller, New City, N.Y., Robert Herman
Lenhard, Paramus, N.J., and Seymour Bernstein, New
City, N.Y., assignors to American Cyanamid Company,
Stamford, Conn.
No Drawing. Filed Mar. 20, 1969, Ser. No. 808,983
Int. Cl. C07c 173/00
U.S. Cl. 260—239.55         1 Claim

ABSTRACT OF THE DISCLOSURE

The compounds 21-chloro or 21-methanesulfonyloxy-6-chloro-16α,17α-isopropylidendioxypregna-4,6 - diene - 3,20-dione are described along with methods of preparing the same. They are useful as anti-fertility agents.

SUMMARY OF THE INVENTION

This invention relates to novel chloropregnadiene acetonides. More particularly, it relates to 6-chloro-16α,17α-isopropylidenedioxypregnadienes and method of preparing the same.

The present compounds may be illustrated by the following formula:

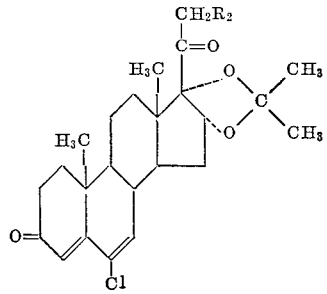

wherein $R_2$ is selected from the group consisting of methanesulfonyloxy and chlorine.

The present compounds are solids having a definite melting point. They are soluble in pyridine and in pure form are white solids.

The present compounds are prepared by starting with 3β,21-diacetoxy-16α,17α-isopropylidenedioxypregn-5 - en-20-one (Compound I of flowsheet hereinafter) which is reacted with m-chloroperbenzoic acid in a solvent such as methylene chloride. The product obtained is 3β,21-diacetoxy-5ξ, 6ξ-epoxy-16α,17α-isopropylidenedioxypregnan-20-one (Compound II). The latter compound when treated with periodic acid produces 3β,21-diacetoxy-5α,6β-dihydroxy-16α,17α-isopropylidenedioxypregnan-20-one (Compound III). On treating this compound with chromic acid in sulfuric acid 3β,21-diacetoxy-5α-hydroxy-16α,17α-isopropylidenedioxypregnane-6,20-dione (Compound IV) is obtained. The latter compound when treated with thionyl chloride in pyridine produces 3β,21-diacetoxy-16α,17α-isopropylidenedioxypregn-4-ene-6,20-dione (Compound V). On treating this compound with phosphorus pentachloride in a solvent 3β,21-diacetoxy-6-chloro-16α,17α-isopropylidenedioxypregna-4,6-dien - 20 - one (Compound-VIA) is obtained. The latter compound when heated with an alkali metal carbonate produces 6-chloro-3β,21-dihydroxy-16α,17α-isopropylidenedioxypregna-4,6 - dien - 20-one (Compound VIB). When the latter compound is contacted with 2,3-dichloro-5,6-dicyanobenzoquinone in a solvent the product 6-chloro-21-hydroxy-16α,17α-isopropylidenedioxypregna-4,6-diene-3,20-dione (Compound VIIA) is obtained. On treating compound (VIIA) with acetic anhydride in pyridine the product 21-acetoxy-6-chloro-16α,17α-isopropylidenedioxypregna-4,6-dione-3,20 - dione (Compound VIIB) is obtained. When the compound VIIA is reacted with methanesulfonyl chloride in pyridine, 6-chloro-16α,17α-isopropylidenedioxy-21 - methanesulfonyloxypregna-4,6-diene-3,20-dione (Compound VIIC) is obtained. Heating the latter compound with lithium chloride in dimethylformamide produces 6,21-dichloro-16α,17α-isopropylidenedioxypregna-4,6-diene-3,20-dione (Compound VIID). The reactions described above are schematically illustrated by the following flowsheet.

FLOWSHEET

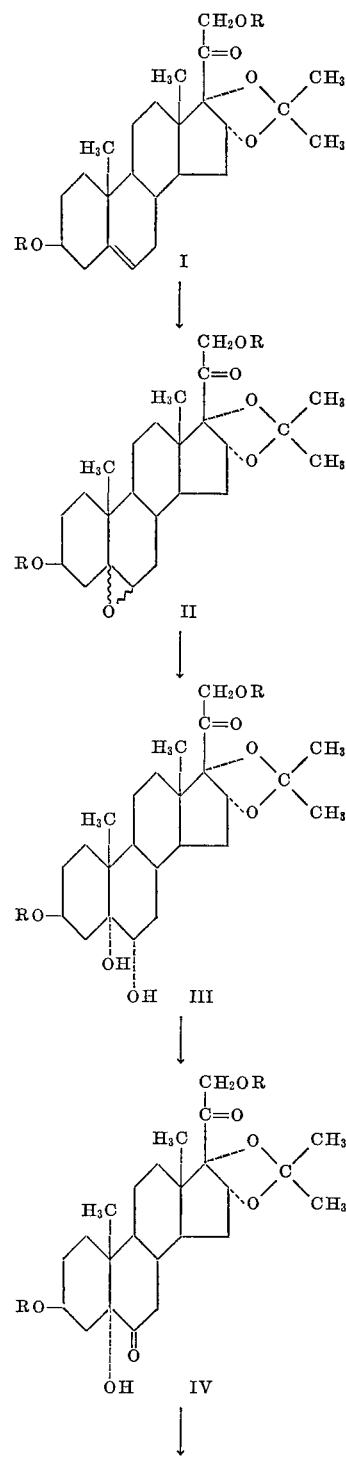

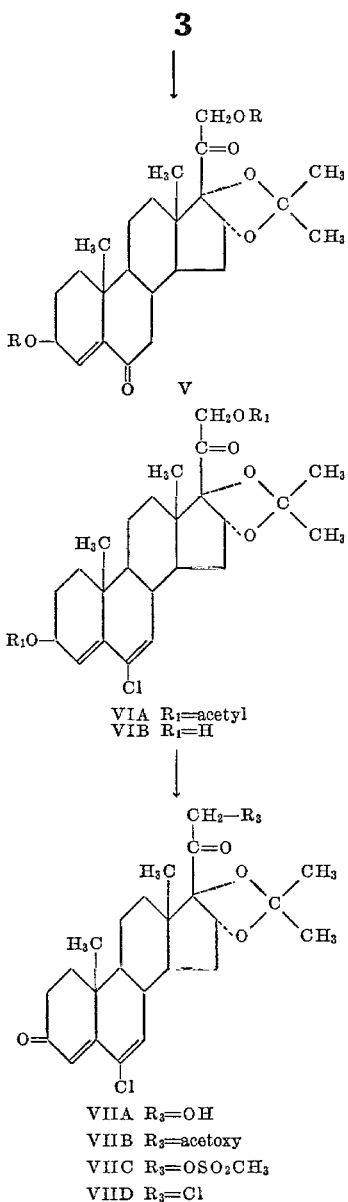

VIA R₁=acetyl
VIB R₁=H

VIIA R₃=OH
VIIB R₃=acetoxy
VIIC R₃=OSO₂CH₃
VIID R₃=Cl

In the above flowsheet, R is loweralkanoyl, $R_1$ is lower alkanoyl or hydrogen and $R_3$ is lower alkanoyl, hydroxyl, methanesulfonyloxy or chlorine.

The present compounds such as 6,21-dichloro-16α,17α-isopropylidenedioxypregna-4,6-diene-3,20-dione are antifertility agents and for example is four times more active than the commercial product 17α-acetoxy-6-chloropregna-4,6-diene-3,20-dione.

DETAILED DESCRIPTION

The following examples describe in detail the preparation of the compounds of the present invention.

EXAMPLE 1

Preparation of 3β,21-diacetoxy-5ξ,6ξ-epoxy-16α,17α-isopropylidenedioxypregnan-20-one (II)

A solution of m-chloroperbenzoic acid (500 mg.) in methylene chloride (25 ml.) is added to a solution of 3β,21-diacetoxy - 16α,17α - isopropylidenedioxypregn-5-en-20-one (I) (500 mg.) in methylene chloride (25 ml.). After standing at room temperature for 66 hours, the reaction mixture is poured into saturated sodium carbonate solution and the organic extract is washed with water, dried and evaporated. The crude oxide (509 mg., melting point 199–208° C., homogeneous by thin layer chromatographic analysis is crystallized from methanol to afford 422 mg. of the above product, melting point 213–215° C. One additional crystallization did not alter the melting point but NMR analysis indicated the constant melting material is a mixture of approximately 75% α- and 25% β-oxides.

EXAMPLE 2

Preparation of 3β,21-diacetoxy-5α,6β-dihydroxy-16α,17α-isopropylidenedioxypregnan-20-one (III)

A solution of 3β,21-diacetoxy-5ξ,6ξ-epoxy-16α,17α-isopropylidenedioxypregnan-20-one (Example 1) (100 mg.) in acetone (6 ml.) is treated with periodic acid (125 mg.) in water (2 ml.). The reaction mixture is refluxed for 1 hour and then concentrated with the simultaneous addition of water to afford a crystalline precipitate. The product is filtered and washed with water to yield 170 mg., melting point 264–267° C. Two crystallizations from acetone-water gives the analytical sample, melting point 268.5–270° C.

EXAMPLE 3

Preparation of 3β,21-diacetoxy-5α-hydroxy-16α,17α-isopropylidenedioxypregnane-6,20-dione (IV)

A solution of 8 N chromic acid in sulfuric acid (5.6 ml.) is added dropwise over a period of 8 minutes to a stirred solution of 3β,21 - diacetoxy - 5α,6β - dihydroxy-16α,17α-isopropylidenedioxypregnan-20-one (Example 2), (6.89 g.) in acetone (180 ml.) at room temperature. After allowing the reaction to proceed for an additional 8 minutes, the reaction mixture is poured into a large volume of ice-water and the product is filtered and washed with water to afford 6.24 g., melting point ca. 132–157° C. with previous softening at 118° C., bubbles in melt, partial resolidification at ca. 170° C. and remelting at ca. 190–195° C. A portion is recrystallized twice from acetone-water to afford the analytically pure sample, melting point slow effervescence from ca. 122° C. on with some resolidification at ca. 165–170° C. and remelting at ca. 189–193° C. (unchanged after drying under reduced pressure overnight at 110° C.).

EXAMPLE 4

Preparation of 3β,21-diacetoxy-16α,17α-isopropylidenedioxypregna-4-ene-6,20-dione (V)

A solution of 3β,21-diacetoxy-5α-hydroxy-16α,17α-isopropylidenedioxypregnane-6,20-dione (Example 3) (156 mg.) in pyridine (1.5 ml.) is cooled to 0° C. and thionyl chloride (0.15 ml.) is added dropwise with swirling. The reaction mixture is allowed to remain at 0° C. for 1 hour, chipped ice is then added and the precipitated product is filtered and washed with water to afford 135 mg. of the above product, melting point 184.5–188° C. Several recrystallizations from acetone-hexane provides the sample for analysis, melting point 195–198° C.;

$\lambda_{max}^{MeOH}$ 236–237 mμ (ε 7,100)

EXAMPLE 5

Preparation of 3β,21-diacetoxy-6-chloro-16α,17α-isopropylidenedioxypregna-4,6-dien-20-one (VIA)

Phosphorous pentachloride (1.27 g.) is added to a solution of 3β,21-diacetoxy - 16α,17α -isopropylidenedioxypregn-4-ene-6,20-dione (Example 4), (1.27 g.) in carbon tetrachloride (60 ml.) and the suspension is shaken at room temperature for 45 minutes. Pyridine (2.6 ml.) is added and the reaction mixture is poured into saturated sodium bicarbonate solution. The organic phase is washed with water, dried and evaporated to a glassy residue, 1.27 g., λmax. 237, 244 and 252.5 mμ (ε 12,950, 14,750 and 10,200, respectively). The residue is dissolved in a small amount of benzene and adsorbed on a synthetic magnesium silicate (69 g.). Elution with 2% acetone-hexane (10× 100 ml. fractions) affords 700 mg. of crystalline solid. Crystallization from acetone-hexane gives the above VIA (640 mg.), melting point 115–120° C. bubbles in melt, λmax. 236–237, 243.5 and 252 mμ (ε 19,400, 22,450 and 15,050 respectively). A 300 mg. portion is recrystallized twice from acetone-hexane to give 265 mg., melting point 123.5–127° C.;

$\lambda_{max.}^{MeOH}$ 236 mμ (ε 22,650), 243 mμ (ε 26,050) and 252 mμ (ε 17,700)

EXAMPLE 6

Preparation of 6-chloro-3β,21-dihydroxy-16α,17α-isopropylidene-dioxypregna-4,6-dien-20-one (VIB)

A solution of 3β,21-diacetoxy-6-chloro-16α,17α-isopropylidenedioxypregna-4,6-dien-20-one (Example 5) (330 mg. and potassium bicarbonate (130 mg.) in 10% aqueous methanol (25 ml.) is refluxed under an atmosphere of argon for 30 minutes. The reaction mixture is cooled to room temperature and water is added to the point of turbidity to precipitate long white needles. After cooling, the product is filtered and washed with water to give 222 mg. of the above compound, melting point 202–203.5° C.;

$\lambda_{max.}^{MeOH}$ 235.5, 243 and 251.5 mμ (ε 19,450; 23,000 and 15,300, respectively)

EXAMPLE 7

Preparation of 6-chloro-21-hydroxy-16α,17α-isopropylidenedioxypregna-4,6-diene-3,20-dione (VIIA)

2,3-dichloro-5,6-dicyanobenzoquinone (697 mg.) is added to a solution of 6-chloro-3β,21-dihydroxy-16α-isopropylidenedioxypregna-4,6-dien-20-one (Example 6) 1.39 g. in peroxide-free dioxane (25 ml.), and the reaction mixture is allowed to stand at room temperature for 18 hours. The precipitated hydroquinone is filtered and washed with a small amount of dioxane. The filtrate is evaporated and the residue is dissolved in methylene chloride and adsorbed on a small pad of activated magnesium silicate to remove any residual hydroquinone. Elution with approximately 250 ml. of methylene chloride and evaporation gives the product as a glass in quantiative yield. VIIA resisted crystallization and is characterized as the acetate VIIB (vide infra). Spectral and thin layer chromatographic analysis indicated that the crude alcohol is suitable for further transformations.

EXAMPLE 8

Preparation of 21-acetoxy-6-chloro-16α,17α-isopropylidenedioxypregna-4,6-diene-3,20-dione (VIIB)

A solution of 6-chloro-21-hydroxy-16α,17α-isopropylidenedioxypregna-4,6-diene-3,20-dione (Example 7) (100 mg.) in pyridine (1 ml.) and acetic anhydride (0.5 ml.) is allowed to stand at room temperature for 18.5 hours. The reaction mixture is poured into ice-water and the product is filtered and washed with water to give the above product, 102 mg., melting point 186–190° C. Two recrystallizations from acetone-hexane and two from acetone-water affords the analytical sample, melting point 195.5–197° C.;

$\lambda_{max.}^{MeOH}$ 285 mμ (23,600)

EXAMPLE 9

Preparation of 6-chloro-16α,17α-isoproyplidenedioxy-21-methane-sulfonyloxypregna-4,6-diene-3,20-dione (VIIC)

Methane sulfonyl chloride (0.56 ml.) is added dropwise with swirling to a cold solution of 6-chloro-21-hydroxy - 16α,17α - isopropylidenedioxypregna - 4,6-dione - 3,20-dione (Example 7), (1.36 g.) in pyridine (10 ml.). After standing at −3° C. for 19 hours, the reaction mixture is poured into ice-water and the precipitated product is collected and washed with water to afford the above compound, 1.45 g., melting point 106–120° C. with previous softening at ca. 100° C. Infrared and thin layer chromatographic analyses indicate that the mesylate is of sufficient purity for the next reaction.

EXAMPLE 10

Preparation of 6,21-dichloro-16α,17α-isopropylidenedioxypregna-4,6-diene-3,20-dione (VIID)

A solution of 6-chloro-16α,17α-isoproylidenedioxy-21-methanesulfonyloxypregna-4,6-diene-3,20-dione (Example 9) (214 mg.) and lithium chloride (60 mg.) in dimethylformamide (10 ml.) is refluxed for 30 minutes. The reaction mixture is evaporated, water is added and the crude soild (179 mg.) is filtered, washed with water and recrystallized from acetone-hexane to give the above product, 150 mg., melting point 258.5–260° C. with decomposition. The product is dissolved in methylene chloride and filtered through a small pad of activated magnesium silicate to remove a small amount of yellow color. The evaporated filtrate is crystallized twice from acetone-hexane to afford the analytical sample, melting point 264–265.5° C., decomposition at 267° C.;

$\lambda_{max.}^{MeOH}$ 284.5 mμ (ε 25,150)

What is claimed is:
1. The compound 6-chloro-16α,17α-isopropylidenedioxy-21-methanesulfonyloxypregna-4,6-diene-3,20-dione.

References Cited
UNITED STATES PATENTS

| | | | |
|---|---|---|---|
| 3,053,838 | 9/1962 | Fried | 260—239.55 |
| 3,213,087 | 10/1965 | Bowers et al. | 260—239.55 |
| 3,234,214 | 2/1966 | Diassi et al. | 260—239.55 |

ELBERT L. ROBERTS, Primary Examiner